United States Patent [19]

Rector et al.

[11] Patent Number: 5,050,130

[45] Date of Patent: Sep. 17, 1991

[54] SIGNAL PROCESSING TO ENABLE UTILIZATION OF A RIG REFERENCE SENSOR WITH A DRILL BIT SEISMIC SOURCE

[75] Inventors: James Rector, Menlo Park; Bruce Marion, Mountain View; Bernard Widrow, Stanford, all of Calif.; Iraj A. Salehi, Naperville, Ill.

[73] Assignee: Gas Research Institute, Chicago, Ill.

[21] Appl. No.: 521,229

[22] Filed: May 9, 1990

Related U.S. Application Data

[63] Continuation of Ser. No. 260,784, Oct. 21, 1988, Pat. No. 4,926,391.

[51] Int. Cl.⁵ .................. G01V 1/40; G01V 1/28
[52] U.S. Cl. ........................ 367/41; 367/27; 367/45; 367/57; 364/421; 364/422
[58] Field of Search .................. 367/25, 27, 39, 41, 367/43, 45, 57; 364/421, 422

[56] References Cited

U.S. PATENT DOCUMENTS

| | | | |
|---|---|---|---|
| 3,939,461 | 2/1976 | Parvulescu | 367/189 |
| 4,207,619 | 6/1980 | Klaveness | 367/57 |
| 4,223,399 | 9/1980 | Haskett | 367/41 |
| 4,363,112 | 12/1982 | Widrow | 367/49 |
| 4,706,225 | 11/1987 | Raoult | 367/43 |
| 4,718,048 | 1/1988 | Staran et al. | 367/41 |

OTHER PUBLICATIONS

Widrow et al.; "Adaptive Signal Processing"; 1985, Prentice Hall, ISBNO-13-004029-0; pp. 200-211 and 337-339.

Primary Examiner—Nelson Moskowitz
Attorney, Agent, or Firm—Flehr, Hohbach, Test, Albritton & Herbert

[57] ABSTRACT

An apparatus (10) for providing while drilling information on a subterranean geologic formation (28) includes a drilling rig (12) and a rotary drill bit (18) attached to the drilling rig (12) for providing seismic waves as it drills in the earth (16). Geophones (20) are spaced from the rotary drill bit (18) in the earth (16) and receive indirect seismic wave paths (26) and seismic wave paths (30) reflected from the subterranean geologic formation (28) the seismic waves provided by the drill bit (18). A reference sensor (24) is located on the drilling rig (12). The seismic signals sensed by the reference sensor (24) and by the geophones (20) are cross-correlated to separate the drill bit generated signals from interference signals by combining the reference signals and the signals received by the geophones (20). The cross-correlated reference signals and the signals received by the geophones (20) are separated into a first group of the drill bit generated seismic signals travelling to the geophones (20) in direct paths and a second group of the drill bit generated seismic signals travelling to the geophones (20) in paths reflected from the subterranean geologic formation (28). The cross-correlation provides a domain where drill bit generated energy can be distinguished from interference. The two groups of the drill bit generated seismic signals can then be used to image the subsurface seismically so as to improve the chances of discovering hydrocarbons. The techniques is applicable to land operations and to drilling from an offshore platform over water.

30 Claims, 8 Drawing Sheets

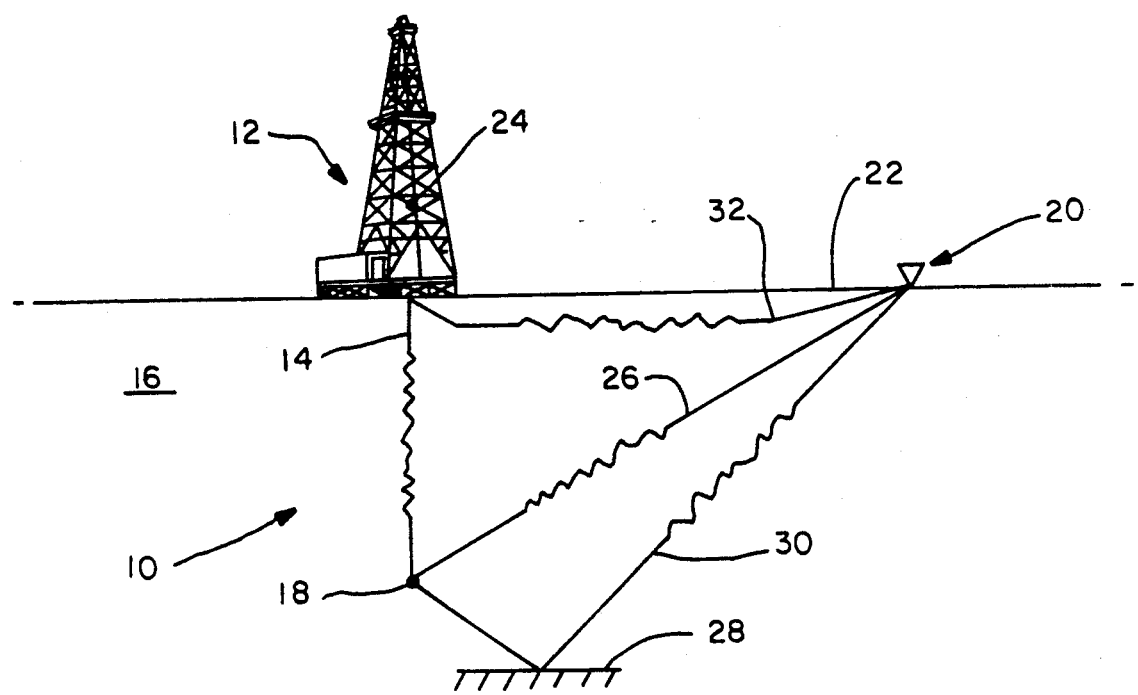
FIG.—1
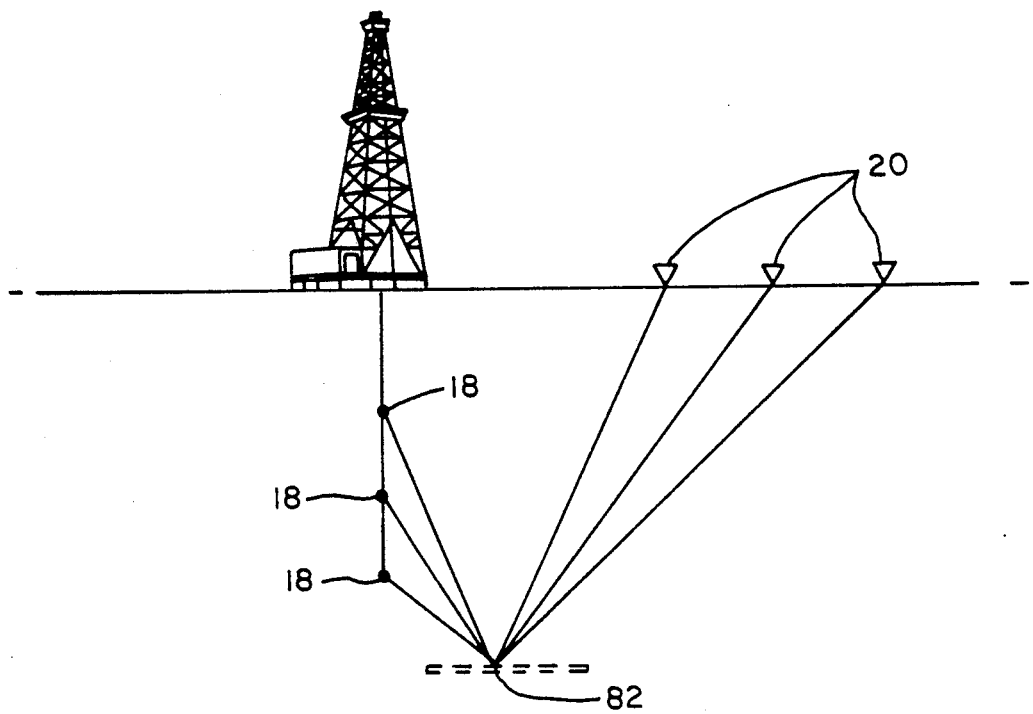
FIG.—6

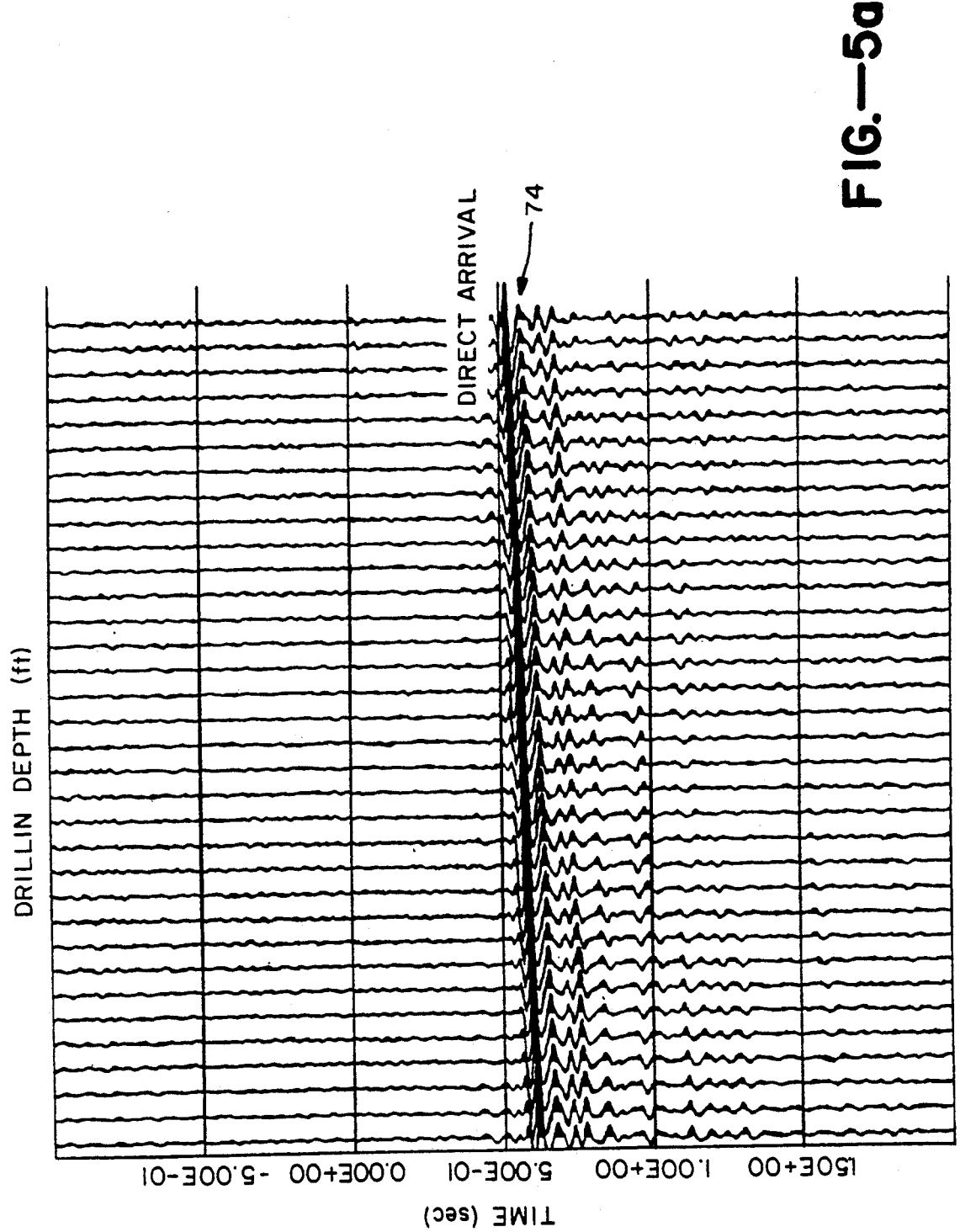
FIG.—5a

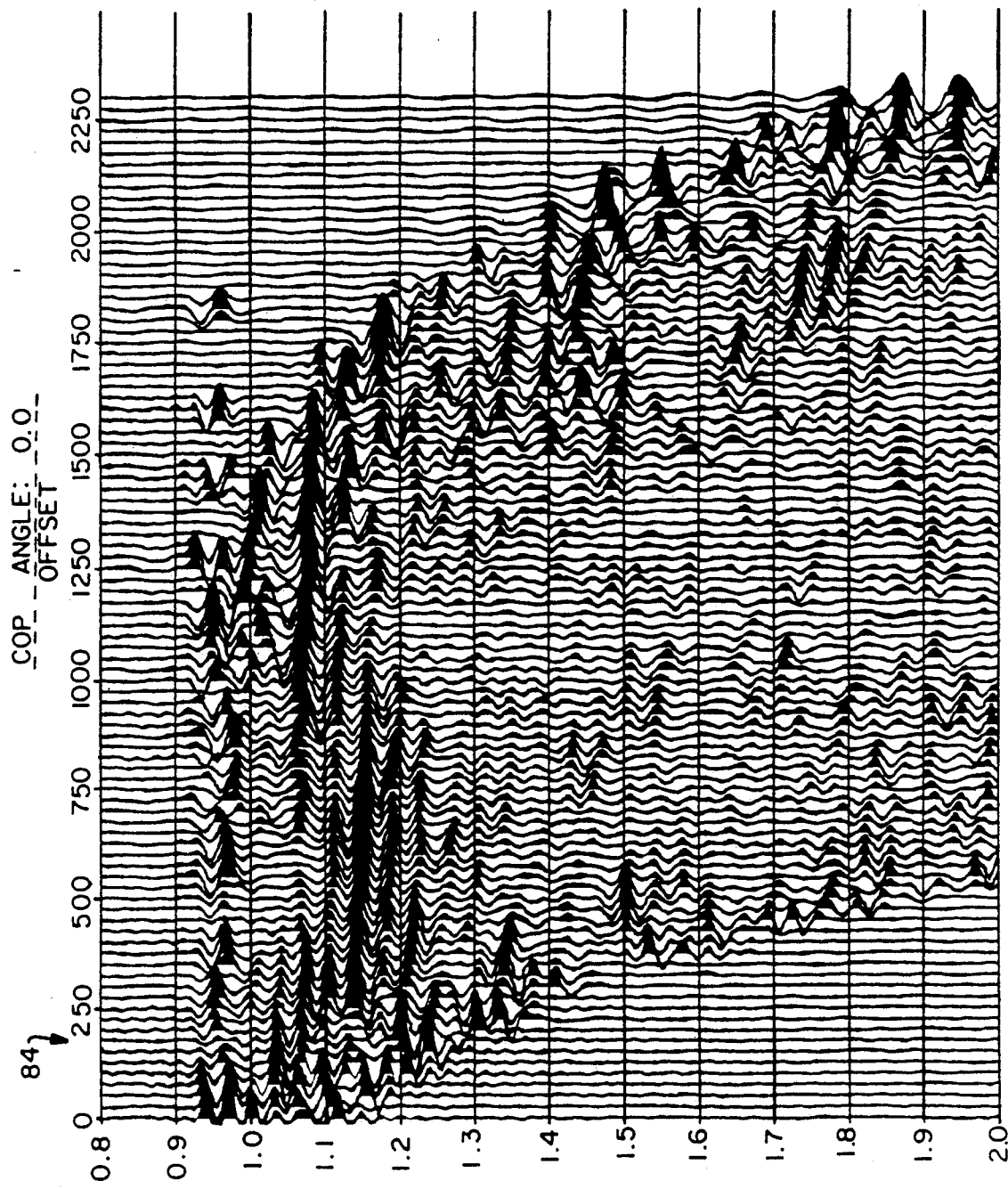
FIG.—7

SIGNAL PROCESSING TO ENABLE UTILIZATION OF A RIG REFERENCE SENSOR WITH A DRILL BIT SEISMIC SOURCE

This is a continuation of application Ser. No. 260,784 filed Oct. 21, 1988, now U.S. Pat. No. 4,926,391.

BACKGROUND OF THE INVENTION

1. Field of the Invention

This invention concerns an apparatus and method by which the random acoustic vibrations emanated by a drill bit while drilling can be used to create seismic images of the subsurface in a region in the vicinity of the borehole. More particularly, it relates to such an apparatus and method in which sensors are positioned to provide more complete information on subterranean geologic formations. Most especially, it relates to such an apparatus and method in which improved reference signals and improved signal processing techniques are available.

2. Description of the Prior Art

Conventional reflection seismology utilizes surface sources and receivers to detect reflections from subsurface acoustic impedance contrasts. The obtained image often suffers in spatial accuracy, resolution and coherence due to the long travel paths between source, reflector and receiver. It is well known to seismologists that the recorded signal amplitude at the receiver, A(r), is related to the input signal amplitude, $A_o$, through the travel-path by:

$$A(r) = \frac{A_o}{r} e^{-\alpha r}$$

where
$\alpha$ = The absorption coefficient of the earth along the travel-path
r = The travel path length
Longer travel paths have lower recorded amplitudes.

A technique commonly known as Vertical Seismic Profiling (VSP) records seismic data to image the subsurface in the vicinity of the borehole. With VSP a source(s) is activated at the surface and a sensor(s) is suspended at a discrete borehole depth with a wireline. Data is recorded and the process is repeated for several borehole depths. Acquiring VSP data is highly impractical if multiple surface source locations are desired. Each new source is costly to apply and adds to the acquisition time as well as the rig inactivity period. A Vertical Seismic Profile is therefore prohibitively expensive to implement when may source positions are used.

With a downhole source, the VSP geometry is inverted. Source locations become receiver locations and vice versa. A downhole source overcomes the logistical limitations inherent in using multiple surface sources for Vertical Seismic Profiling. Data can be acquired simultaneously at many sensor locations proximal to the Earth's surface with little more expense than a single location.

One of the earliest patents concerning downhole sources is Weatherby, U.S. Pat. No. 2,062,151, issued Nov. 24, 1936, which uses the drill bit as an impulse generator of seismic waves. Drilling is done with a cable tool, which is dropped on the hole bottom. This creates seismic impulses. Bit location and wave velocity can be obtained using these impulses. Drill bit generated direct wave arrival time differences between two non coincidental geophone locations are used to determine rock acoustic velocity The Widrow U.S. Pat. Nos. 4,363,112 and 4,365,322, issued Dec. 7 and Dec. 21, 1982, use the continuous, natural, random vibrations of a rotary drill bit to launch seismic waves into the earth. Spectral amplitudes and interference patterns are used to image subsurface reflectors.

There are a number of previous patents concerned with the use of seismic downhole sources other than the drill bit. All of these patents make use of an artificial transducer situated at a given depth in the borehole. Broding et al., U.S. Pat. No. 3,909,776, issued September 1975 and Farr and Ward, U.S. Pat. No. 3,881,168, issued April 1975, use a fluid driven oscillator (as described by Galle in U.S. Pat. Nos. 3,520,362, 3,730,269, 3,860,902 to emit seismic waves into the earth from a position within a wellbore. Farr and Ward require that the seismic source be monofrequency. Phase delays between a geophone located on the surface near the well and another located near the top of the well are used to produce a log of travel-time and compressional wave velocity as a function of depth. Broding et al. use a fluid driven oscillator which changes emitted frequency as a function of time, much like a Vibroseis source, as described in U.S. Pat. No. 2,688,124. The repeatable pattern of the oscillator can then be used as a signal to cross-correlate with received geophone signals. Arrival times of events as determined by peaks in the cross-correlations can then be used to seismically image the subsurface.

The patent literature describes other types of downhole seismic sources which emit pulses into the subsurface. For example, Klaveness, U.S. Pat. No. 4,207,619, issued June 10, 1980, uses a pulse generator located in the drillstring just above the drill bit. The source is activated and the arrival time measured at the earth's surface and at the top of the drillstring on the swivel. The swivel location is used as a "zero point" sensor from which pulse arrival time differences can be measured. Arrival times are calculated from visual inspection of time-domain signals received by the geophones.

While the art pertaining to seismology is clearly a well-developed one, a need still remains for further development of it in order to meet the demands of gas, oil and other resource exploration.

SUMMARY OF THE INVENTION

Accordingly, it is an object of this invention to provide an apparatus and method for providing information on a subterranean geologic formation in which sensors for drill bit generated seismic waves are positioned to make improved use of a reference signal to provide the desired information.

It is another object of the invention to provide such an apparatus and method in which the desired information is obtained by improved signal processing made possible by the reference signal.

It is a further object of the invention to provide such an apparatus and method in which all of the signals used to obtain the desired information originate from the drill bit.

It is still another object of the invention to provide such an apparatus and method which is non-invasive and generates the signals used to obtain the desired information while drilling.

It is a still further object of the invention to provide such an apparatus and method which will give real time subsurface information.

The attainment of these and related objects may be achieved through use of the novel apparatus and method herein disclosed. An apparatus for providing while drilling information on a subterranean geologic formation in accordance with this invention includes a drilling rig and a rotary drill bit attached to the drilling rig for providing periodic seismic waves as it drills in the earth. There is at least one seismic wave sensor spaced from the rotary drill bit in the earth for receiving signals traveling via direct seismic wave paths and signals traveling via seismic wave paths reflected by the subterranean geologic formation from the seismic waves provided by the drill bit. At least one reference sensor is located on or proximate to the drilling rig. A means is connected to receive the reference signal from the reference sensor and the drill bit generated signals from the at least one seismic wave sensor to distinguish the drill bit generated signals from interference signals by cross-correlating the reference and seismic wave sensor signals. In a preferred form, the apparatus has a means connected to receive the reference signals either prior to or subsequent to their cross correlation for reference deconvolution or whitening. A means is connected to receive the cross-correlated reference and seismic wave sensor signals for eliminating rig generated energy from the reference signals. A means is connected to receive the cross correlated reference and seismic wave sensor signals from the rig generated energy eliminating means for separating the seismic wave sensor signals into a first group of the seismic wave sensor signals representing the drill bit generated seismic waves received by the at least one seismic wave sensor in the direct seismic wave paths, and a second group of the seismic wave sensor signals representing the drill bit generated seismic waves received by the at least one seismic wave sensor in the seismic wave paths reflected by the subterranean geologic formation.

In the method for providing information on a subterranean geologic formation of this invention, seismic signals are provided by a rotary drilling bit while drilling in the earth with the rotary drilling bit. The drill rig could be on land or on an offshore platform. The seismic signals provided by the drilling bit are received via direct seismic signal paths and seismic signal paths reflected from the subterranean geologic formation in at least one location in the earth spaced from the rotary drilling bit. The drill bit generated seismic signals are received as reference signals proximate to a drilling rig connected to the rotary drilling bit. The seismic signals sensed proximate to the drilling rig and spaced from the drilling rig are cross-correlated to allow the drill bit generated signals to be distinguished from interference signals by combining the reference signals and the signals received spaced from the drilling rig. The cross-correlated reference signals and the signals received spaced from the drilling rig are separated into a first group containing drill bit generated seismic signals travelling to the at least one location spaced from the drilling rig in direct paths and a second group containing drill bit generated seismic signals travelling to the at least one location spaced from the drilling rig in paths reflected from the subterranean geologic formation.

Our apparatus and method is significantly different from the above prior art techniques. Like Weatherby and Widrow, we use the drill bit as a generator of seismic waves. However, we employ very different acquisition and processing techniques to exploit the drill bit generated seismic energy. Techniques such as acquiring the seismic data simultaneously at a reference location on the drill rig as well as with geophones located in the earth, cross-correlation of the rig reference sensor signal with received geophone signals and associated processing such as deconvolution of the rig reference signal and attenuation of rig generated interference improve over the Weatherby and Widrow techniques.

All of the prior art using downhole sources do not use the drill bit signal to seismically image the subsurface They all require that an artificial transducer be located in the borehole. Some such as Farr and Ward, and Klaveness, use signals from a sensor located at the top of the drill pipe to aid in processing and interpreting the data. Broding et al. do not use a sensor located at the top of the drill pipe but do make use of cross-correlation techniques to determine arrival times of events. None of this prior art uses the cross-correlation function between a rig sensor signal and geophone signals to measure arrival times of events originating from the drill bit. None of the prior art teaches means of separating reflected drill bit energy from directly traveling drill bit energy and rig generated interference.

Drill bit generated seismic energy travels into the earth and to geophone locations on the earth's surface via many different travel paths. Some of the major travel paths are illustrated in FIG. 1. In addition to direct and reflected paths, drill bit generated energy also travels up the drillstring to the drill rig. Some of this energy continues from the drill rig into the earth and travels to the geophones, introducing coherent interference. By cross-correlating the signal from a rig mounted reference sensor with signals from geophones located some distance from the borehole in the earth, relative arrival times of events between signals from the rig sensor and the geophones can be measured.

The rig reference signal causes complications in the cross-correlated data not encountered when using conventional seismic sources. The rig reference signal has a highly colored spectrum and contains multiple sources of noise from the rig's drilling machinery. The rig reference signal is further complicated by multipath and losses in the drillstring. These problems are solved by the methods taught herein. Deconvolution can be used to whiten the spectrum of the rig reference signal and reduce multipath effects and losses in the drillstring. In addition, coherent interference radiated by the drill rig can be attenuated through spatial filtering.

Using drilling data recorded from one or a number of field sensors, and having made these recordings at many drilling depths, methods are shown to create two and three dimensional seismic images. These methods include wavefield separation and Common Reflection Point transformation and analysis.

The drill bit downhole source holds several advantages over proposed and existing downhole sources. All downhole seismic sources are special transducers used to generate seismic waves. Such sources require that the rig remain idle for the period of time when they are activated. Their use poses risk to the borehole and causes loss of rig time. They are expensive and unreliable devices. In contrast, the drill bit source is passive, utilizing natural acoustic emanations of the drill bit while drilling. Use of the drill bit is non-invasive, having no effect on the drilling process and introducing no additional risk to the borehole. Moreover, imaging with the drill bit source is a measure-while-drill (MWD) technique. The information provided by a survey based on this technique in real time may have a significant impact on various drilling related decisions. For example, it is often desirable to determine the location of specific geologic horizons relative to the drill bit depth in order to optimize drilling parameters. If an overpressured zone were expected, accurate knowledge of depths at which formation over-pressuring occurred would facilitate amendments to a drilling fluids program and reduce blow out risk. Conventional VSP methods of overpressure identification require that drilling be stopped to conduct the survey.

The subsurface seismic images constructed while drilling ma also aid the explorationist in determining whether and/or when the target horizons will be penetrated if the drilling plan is followed and whether the plan needs updating.

This invention teaches how to record and isolate the drill bit generated direct and reflected seismic energy traveling in the earth from the seismic energy recorded at locations on and in the vicinity of the drill rig. The drill bit generated direct and reflected energy can then be used to obtain subsurface seismic images in the vicinity of the borehole.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a schematic representation of an apparatus in accordance with the invention.

FIGS. 5A and 5B are additional waveform diagrams obtained after further signal processing of the signals shown in FIG. 3A.

FIG. 6 is a schematic representation useful for understanding further operation of the apparatus of FIG. 1.

FIG. 7 is a set of signal waveforms illustrating the operation of the apparatus of FIG. 1 explained in connection with FIG. 6.

DETAILED DESCRIPTION OF THE INVENTION

Figure 2:
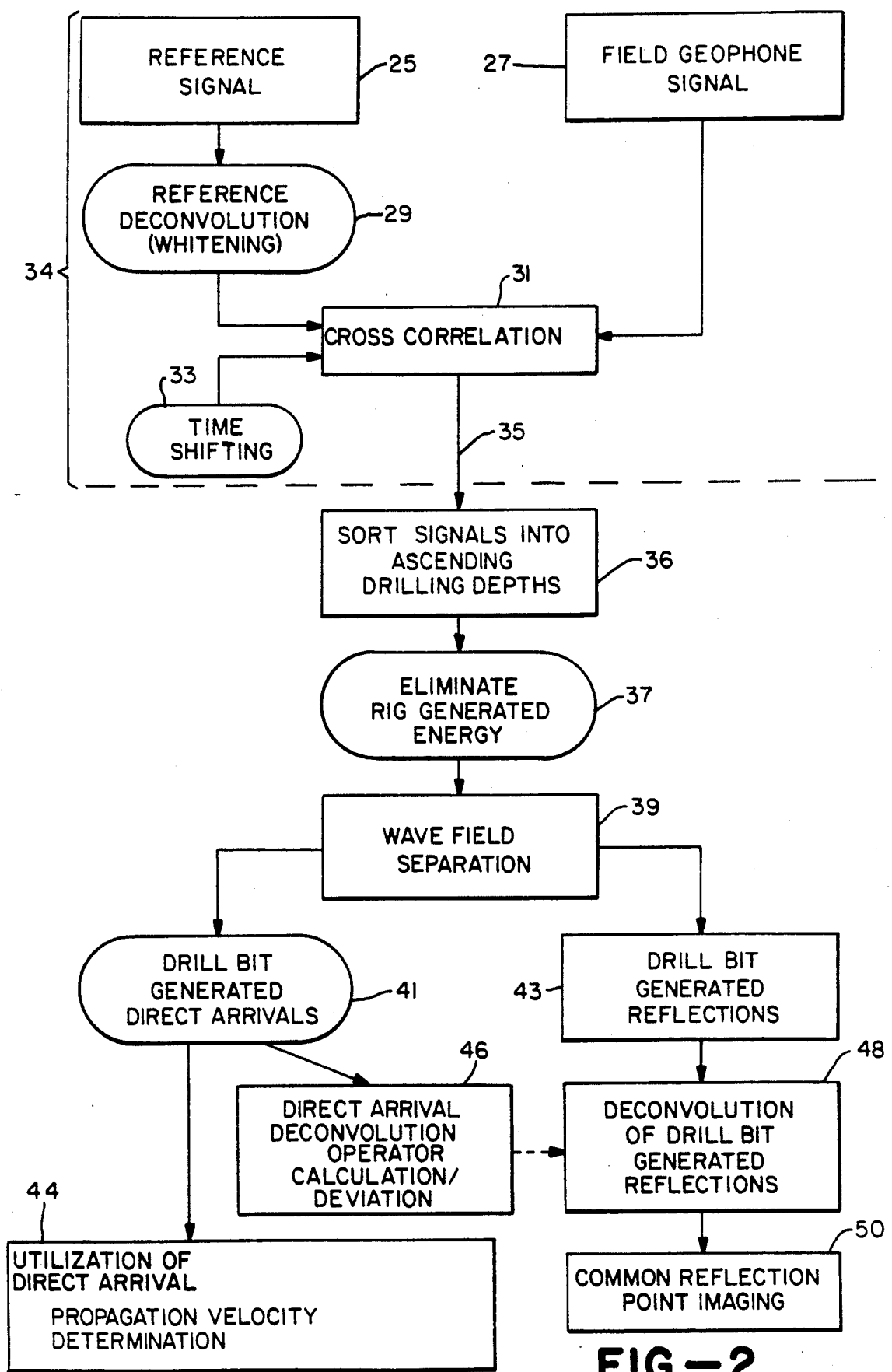
FIG. 2 is a flow chart of a process in accordance with the invention

Turning now to the drawings, more particularly to FIG. 1, there is shown a seismic signal generation and analysis apparatus 10 in accordance with the invention. The apparatus 10 includes a drilling rig 12, a drillstring 14 extending into earth 16 from the drilling rig 12, and a drill bit 18 at the end of the drillstring 14. A group of geophone seismic sensing elements, generally indicated at 20, is provided in the earth 16, near its surface 22. A reference geophone seismic sensing element 24 is mounted on the drilling rig 12, such as above the kelly.

In operation of the apparatus 10, the drill bit 18 generates seismic waves while drilling a borehole, as is explained more fully in the above-referenced Widrow patents. These seismic waves are propagated through the earth 16 to the seismic sensing elements 20 both directly, as indicated at 26, and by reflection from one or more subterranean geologic formations 28, as indicated at 30. The seismic waves are further propagated along the drillstring 14 to the reference sensing element 24 on the drilling rig 12. Interference signals are generated by the drilling rig 12, and are also propagated to the seismic sensing elements 20, as indicated at 32, and also to the reference sensing element 24.

The resulting seismic energy is recorded by the reference vibration sensor 24 located on the drill rig and simultaneously at the field sensors (geophones) 20 located in the earth 16 at selected distances from the borehole. The seismic energy consists not only of energy emanated by the drill bit 18, but also other components of the drilling apparatus such as diesel engines, compressors, etc. The sound recorded by field sensors 20 contains not only the signals associated with drilling, but also components which may be unrelated to drilling The latter include any cultural noise such as vehicles, people, animals, weather (wind and rain), etc. The vibrational energy recorded by the sensor 24 on the swivel or on the drill rig is used as a reference signal with which to cross-correlate the geophone outputs. Cross-correlation, as described by Doty in U.S. Pat. No. No. 2,688,124, provides means by which arrival times of energy which is coherent between the reference signal and the geophone outputs can be measured. Energy which is incoherent is not sensed at both reference and field locations and is attenuated in the cross-correlation process.

Our method utilizes a downhole seismic source, acoustic energy generated by the drill bit 18 while drilling, and traveling through the earth 16 via direct and reflected paths 26 and 30 to seismically image the subsurface near the borehole. Seismic data is recorded while a well is being drilled using sensors 20 in the earth in the vicinity of the borehole and on the drill rig 12.

The drill bit signal is an uncontrolled random process. The reference on the drill bit 18 source is obtained remotely by exploiting the vibration from the drill bit 18 arriving at the surface via the drillstring 14. Specialized signal processing as outlined below is used to effectively represent the cross-correlated data as if the source spectrum were controlled and the sensor recording the reference signal were located proximal to the drill bit.

Our method holds several advantages over surface reflection seismology With our method, the travelpath to a reflector 28 is reduced by as much as a factor of 2 from surface reflection seismic paths. It has also been observed that the near surface acts as a strong attenuator of seismic energy, particularly at frequencies above 50 Hz. Using the drill bit 18 signal, the effects of the near surface are halved. Drill bit generated seismic energy arrives via direct as well as reflected travelpaths 26 and 30. Direct arrivals are stronger than reflections and hence can be expected to exhibit a higher signal to noise ratio.

Our method, using the drill bit 18 as a downhole source, overcomes the logistical limitations inherent in using multiple surface sources for Vertical Seismic Profiling. Our data can be acquired simultaneously at many field sensor 20 locations with little more expense than at a single surface location.

FIG. 2 is a flow chart showing how the reference signals 25 generated at the drill rig 12 and the field geophone signals 27 are processed to practice the method of this invention. The reference signals are deconvolved at 29 to whiten them. The deconvolved reference signal is cross-correlated with the field geophone signal 27 at 31. As part of the cross-correlation, the signal 25 is time shifted, as indicated at 33. These steps are repeated for a series of drilling depths, as indicated at 34. The time shifting could occur at any point in the signal processing. The output of the cross-correlation 31 at 35 is a single signal with elements of both input signals 25 and 27. This process is repeated for selected drilling depths. The signals are then sorted according to ascending drilling depths at 36. Rig generated energy is removed from the signal 35 at 37. The signal containing mixed direct and reflected drill bit generated seismic components is then separated at 39 to give the drill bit generated direct arrival component at 41 and the drill bit generated reflected component at 43. Analysis of these two signal components characterizes the subterranean geologic formation from which the component 43 was reflected. The direct arrival component 41 is used at 44 to determine propagation velocity. The direct arrival component 41 is used at 46 to calculate or derive a deconvolution operator. The deconvolution operator 46 is used at 48 to deconvolve the drill bit generated reflected component 43. The deconvolved drill bit generated reflected component is then used at 50 for common reflection point imaging.

REFERENCE DECONVOLUTION

Seismic vibrations from the drill bit 18 are mechanically transmitted through the drill collars and through the drill pipe to the top of the kelly and into the swivel. Hence, the reference signal recorded on the rig 12 at the top of the drillstring corresponds to the bit generated signal modified by the transfer function between the bit 18 and the reference 24. Both coherent noise generated by the drilling machinery and random noise are present at the reference 24. In Z-transform notation:

$$Ref(Z) = Bit(Z)T(Z) + N(Z)$$

Where:
Ref(Z) is the Z transform of the signal recorded at the reference 24;
Bit(Z) is the Z transform of signal generated by the drill bit 18;
T(Z) is the transfer function between the drill bit 18 and the reference 24;
N(Z) is the Z transform of noise, both coherent and random, sensed at the reference 24.

The cross-correlation of the swivel reference 24 signal with a field sensor 20 signal, XCOR(Z), can be represented as $$XCOR(Z) = REF(1/Z)Geo(Z)$$

Where:
Ref(1/Z) is the Z transform of the signal recorded at the reference 24 reversed in time;
Geo(Z) is the Z transform of the geophone 20 output.

To achieve the type of broadband source spectrum that is commonly employed in reflection seismology it may be necessary to whiten the spectrum of the reference signal. This can be accomplished by deriving a whitening filter based on the reference 24 signal, and convolving that filter response with the correlations. The filter response can also be applied prior to cross-correlation with the same effect. The whitening filter derived is an approximation to the inverse of the reference signal 24 reversed in time. This inverse can be found by any number of deconvolution techniques employed in seismic signal processing such as predictive, maximum likelihood, minimum entropy, or spectral factorization, as respectively disclosed in:

Peacock, K.L. and Treitel, S., PREDICTIVE DECONVOLUTION, THEORY AND PRACTICE: *Geoph.* v. 34, pp. 155–169
Mendel, J.P., SINGLE CHANNEL WHITE NOISE ESTIMATORS FOR DECONVOLUTION: *Geoph.*, v. 43, pp 1–22
Bayless J.W. and Bingam J.O. APPLICATION OF THE KALMAN FILTER, *Geoph.*, v. 35, pp. 2–23
Ulrych, T.J., APPLICATION OF HOMOMORPHIC DECONVOLUTION TO SEISMOLOGY, *Geoph.* v. 36, pp. 650–661.

In Z transforms
Step 1: Find 1/Ref(1/Z)
Step 2: Multiply XCOR(Z) by 1/Ref(1/Z)

$$1/Ref(1/Z)XCOR(Z) = 1/Ref(1/Z)Ref(1/Z)Geo(Z) = Geo(Z)$$

Figure 3B:
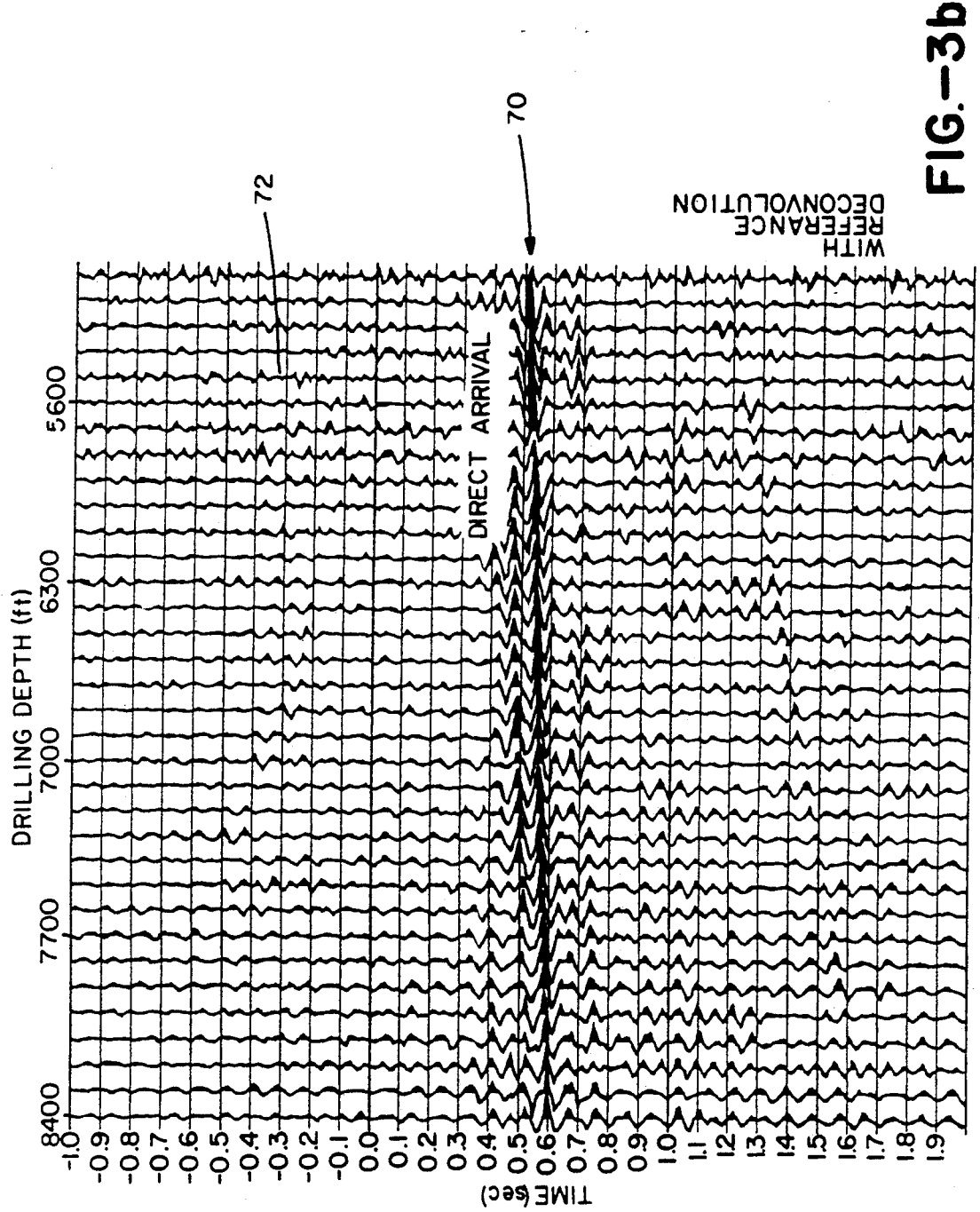
FIGS. 3A and 3B are waveform diagrams of signals obtained using the apparatus of FIG. 1.
Figure 3A:
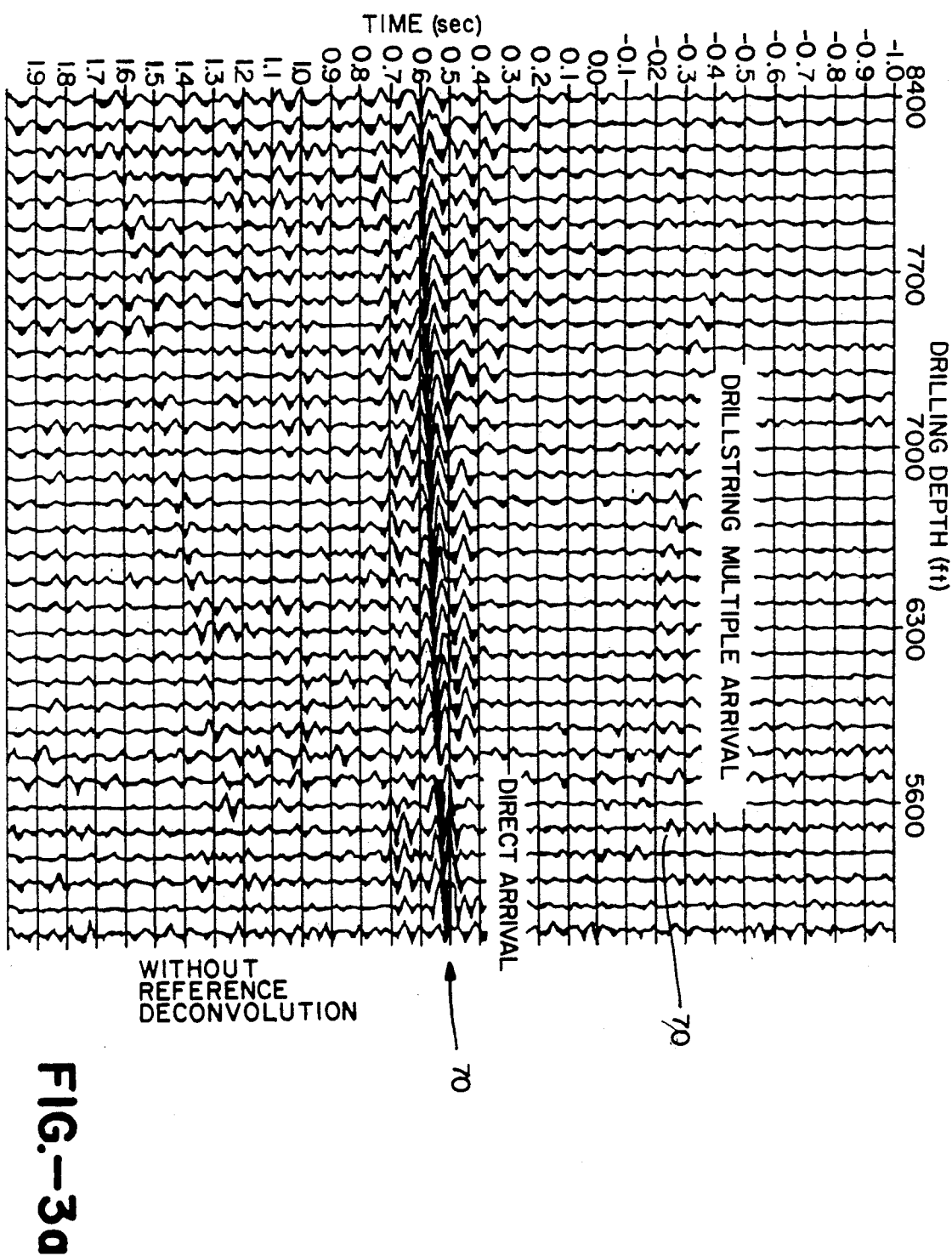

The effects of reference deconvolution on the cross-correlation are shown in FIGS. 3A and 3B. Reference deconvolution causes the wavelet 70 to appear sharper. Spatial and temporal resolution are improved with a sharper wavelet. Reference deconvolution also attenuates multipath in the reference signal 72.

SPATIAL FILTERING OF RIG GENERATED ENERGY

Figure 4:
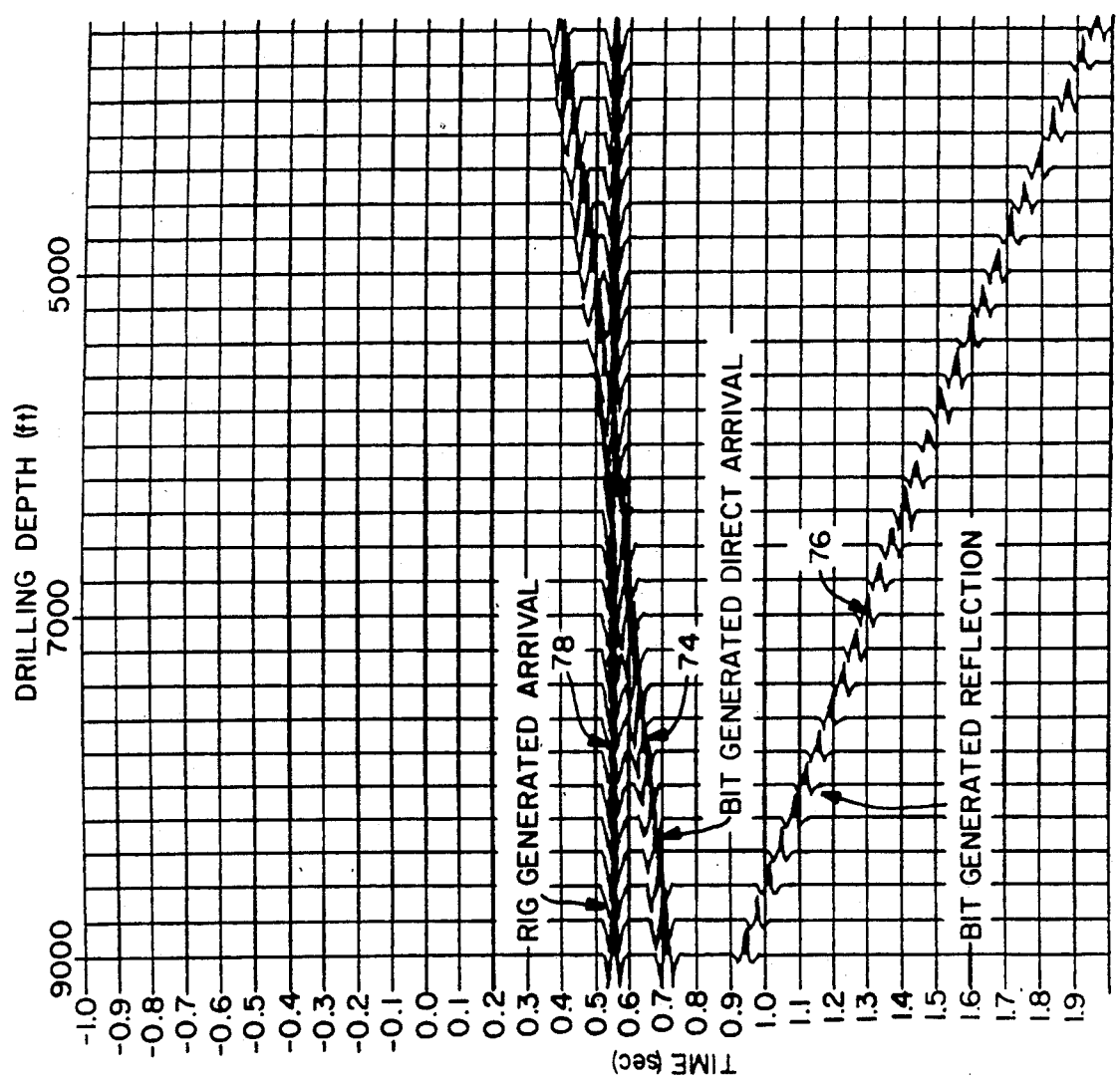
FIG. 4 is another waveform diagram of further signals obtained using the apparatus of FIG. 1.

Since drill bit generated vibrations are picked up on the drill rig, it is not surprising that this vibration travels from the drill rig into the earth. Thus, the drill rig 12 acts as a secondary radiator of seismic energy originally radiated at the drill bit. As FIG. 4 shows, drill bit generated direct and reflected signals 74 and 76 exhibit cross-correlation delay time variation (commonly referred to as "moveout") with drilling depth. In FIG. 4 a series of cross-correlation functions between the rig reference channel 78 and a selected geophone channel are plotted for various selected drill bit 18 depths. As the drill bit 18 goes deeper, the travel-time along the direct ray 74 increases. Conversely, as the drill bit goes deeper, the travel-time along the raypath 76 reflected from a given horizon decreases. The changes in the respective arrival times creates visible moveouts which are evident in the Figure. In contrast to these arrivals is the interference 78 from the drill rig. It is coherent with the useful primary energy, but does not exhibit cross-correlation moveout with drilling depth.

The moveout differences between rig interference 78 and bit generated direct and reflected arrivals 74 and 76 are exploited to attenuate any energy generated by the drill rig 12. Zero moveout energy is equivalent to zero spatial frequency (k=0). A spatial filter designed to attenuate very low spatial frequency data while passing those events with non-zero moveout will attenuate rig generated signals 78 while passing, unharmed, bit generated direct and reflected arrivals 74 and 76. The filtering can be accomplished by any number of spatial filtering techniques, some of which are as follows.

One technique transforms cross-correlated signals from a given geophone group and from a series of drilling depths to the domain of "frequency-wavenumber", or f-k, with a two-dimensional Fourier transform. Different events can then be separated on the basis of apparent velocity Va, which is a slope in the f-k domains $$Va = f/k.$$

The filter is designed by specifying slopes as bounds on the passed or rejected regions of the f-k domain. Energy within the passed region is given a high weighting coefficient, while energy within the rejected region is given a low weighting coefficient. Edge effects of the filter can be minimized by smoothly interpolating the weighting coefficients between the passed and rejected regions of the f-k domain. The filtering can be performed as a multiplication in the f-k domain or as a convolution in the untransformed domain.

Another technique for selectively attenuating or enhancing different types of arrivals begins by time shifting the desired event so that it has zero moveout. In the special case of rig generated energy, no time shifting need be done. Filtering is accomplished as follows. First, the arrival aligned to zero moveout is enhanced by averaging a series of cross-correlations together. This averaging can be done using the mean or the median statistic. The spatial bandwidth of the filter is controlled by the number of cross-correlations averaged. More averaging is equivalent to a tighter filter: The output average is the enhanced version of the aligned zero moveout event. If this is the only goal, the data can now be de-aligned (if necessary). The zero moveout event can be attenuated by subtracting this average from the original data, followed by dealignment.

Further details on these and other spatial filtering techniques are disclosed in the following references:

Embree, P., Burg, J.P., Backus, M.M., WIDE-BAND VELOCITY FILTERING THE PIE-SLICE PROCESS, Geoph., v. 28, pp. 948-974

Treitel, S , Shanks, J.L., Francis, C.W., SOME ASPECTS OF FAN FILTERING, Geoph., v. 32, pp. 789-800

Sengbush, R.L., Foster, M.R., OPTIMUM MULTI-CHANNEL VELOCITY FILTERS, Geoph., v. 33, pp 11-35.

Hildebrand, L., TWO REPRESENTATIONS OF THE FAN FILTER, Geoph., v. 47, pp. 957-959.

That portion of rig generated energy that travels in the near surface may also be attenuated by spatial filters that take advantage of the moveout differences between deep events and those that travel in the near surface. The apparent velocity, $V_a$, of an event across a straight line array is well known to be related to the intrinsic earth velocity and arrival angle by $$V_a = V_{intrinsic}/\cos\theta$$

where $\theta$ is measured with respect to the horizontal Deep arrivals from the drill bit will generally exhibit higher apparent velocities than near surface traveling paths. By implementing arrays which attenuate low apparent velocity energy, near surface traveling interference from the drill rig can often be attenuated. The filter can be implemented in the field, in the form of a geophone string containing a number of geophones each spaced selected distances apart, or later by mixing cross-correlations from several offsets in the computer.

ACCOUNTING FOR DRILLSTRING DELAY

To properly represent the cross-correlated data as if a reference proximal to the drill bit were used, the data must be time shifted. Cross-correlated signals using a reference sensor 24 on drill bit generated energy located at the top of the drillstring 14 are time advanced relative to a reference located at the drill bit. This advance is equal to the travel-time of waves from the drill bit 18 up the drillstring 14 to the top of the drillstring on the drill rig 12. With knowledge of acoustic velocity in the steel pipe drillstring and with knowledge of the drillstring length, the travel-time can be determined. The cross-correlated data is then time shifted to position events as if the reference signal on drill bit generated energy were located at the drill bit 18 itself. Alternatively, the reference signal can be time-shifted prior to cross-correlation.

EXPLOITATION OF DRILL BIT GENERATED DIRECT AND REFLECTED SIGNAL

The aforementioned processing was aimed at arriving at the equivalent of a controlled downhole seismic source, either impulsive or Vibroseis-like. The input to this processing were signals from the drilling sound as sensed at the surface on the drill rig and in the earth in the vicinity of the drill rig. With a broadband downhole seismic source, direct and reflected signals 74 and 76 can be utilized to obtain seismic information about the subsurface in the vicinity of the borehole using some of the following methods.

WAVEFIELD SEPARATION

In exploiting the drill bit generated signal it is necessary to separate the data into two subsets: one containing the direct arrival signal 74, the other containing the portion 76 of the signal coming from reflections beneath the drill bit depth. This process is known as wavefield separation. The processing of VSP data uses wavefield separation to separate "upgoing" (reflections) and "downgoing" (direct arrivals) signals, as disclosed by Hardage, B., VSP PRINCIPLES, Geophy. Press, pp. 173-194. With a downhole source the terms "upgoing" and "downgoing" must be reversed. In this application we have used the terms direct and reflected arrivals to avoid confusion.

Figure 5B:
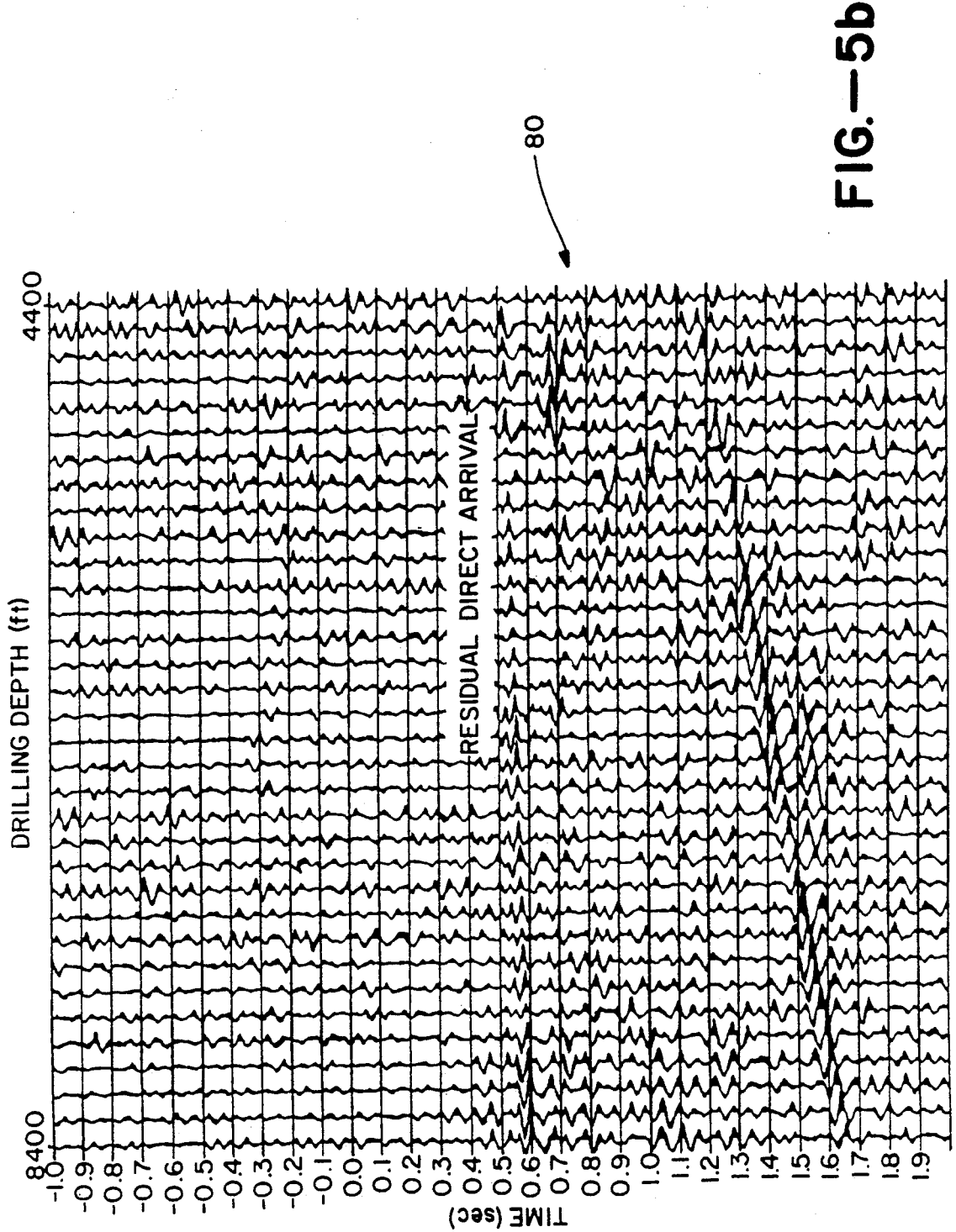

As FIG. 4 shows, drill bit generated direct and reflected signals 74 and 76 can be distinguished in the cross-correlation functions from a single channel based on its arrival time moveout with drill bit depth. Wavefield separation processing exploits moveout differences to separate the data set into the direct arrival signal 74 and reflected arrival signal 76. Spatial filters are used to pass or reject different moveouts. For example, a filter which passed positive moveouts (cross-correlation arrival times which increased with drill bit depth) would enhance the direct arrival 74 while attenuating signals 76 from reflecting layers which have negative moveout. Conversely, a second filter passing negative moveouts and rejecting positive moveouts would enhance reflected signals 76 while attenuating the direct arrival signal 74. Alternatively, the direct arrival 74 can be enhanced by passing a range of positive moveouts. The enhanced direct arrival signal represents one data subset. This subset may be subtracted from the original data to yield the remaining signal. The spatial filter can be a mix of adjacent traces, a pie-slice filter applied in the f-k domain, or any other spatial filtering technique. FIG. 3A shows the original data, FIG. 5A shows the wavefield separated direct arrival 74, and FIG. 5B shows the residual data 80 containing the reflected arrivals. Further processing and stacking is often necessary to enhance the reflected arrivals.

DIRECT ARRIVAL UTILIZATION

The direct arrival 74 from the drill bit 18 holds important information unavailable from surface seismic data. Propagation velocity is available from the direct arrival signal 74.

THE DIRECT ARRIVAL FOR PROPAGATION VELOCITY DETERMINATION

The travel-time for energy from a given drill bit depth to reach the earth's surface via a direct path divided into the distance from the bit to the surface location is equal to the average velocity for that distance. The travel-time difference from two different drill bit depths divided into the differential distance is equal to the interval velocity between these two drill bit depths (the travel-path from the drill bit 18 to the earth's surface may be complicated somewhat by refraction of waves at interfaces, but if the arrivals are near vertical, this effect will be small). The average velocity allows two-way travel-times of near horizontal events on surface seismic data to be converted to subsurface depth. Knowledge of reflector depths provides information which can aid both the explorationist and the driller in many ways. For example, with a knowledge of the depth to a target horizon, a better forecast of drilling time and expenditures can be made. Knowledge of depths of overpressured zones can be of crucial importance during drilling.

Interval velocities can be used to identify stratigraphic units. They are also used in imaging techniques that require an accurate knowledge of wave propagation in the earth.

IMAGING USING DRILL BIT GENERATED DIRECT AND REFLECTED SIGNALS

Imaging using the drill bit source differs from conventional surface seismic imaging because one leg of the travel-path of the reflected arrival is significantly shorter than the other. This phenomena is also the reason for the improved lateral resolution using a downhole source closer to reflecting horizons of interest. In surface seismic data, both legs of the travel-path are approximately the same. Conventional CDP stacking algorithms exploit this geometry by grouping all data that is equidistant between depth or common reflection point, as described in Mayne et al., U.S. Pat. No. 2,732,906. This approximation is accurate for a flat layered earth.

With a drill bit signal, different source 18 and receiver 20 pairs have a common reflection point 82 that is no longer halfway between source 18 and receiver, as shown in FIG. 6. This means that the transformation is arrival time dependent. Different reflections from the same source receiver pairs will have different Common Reflection Points. Cross-correlations from selected drill bit depths and surface geophone locations are associated with arrival times from common reflection point focus depths. The arrival times are calculated by raytracing from source to reflector to receiver through a given velocity model, Cross-correlations from each focus depth are then time shifted (to account for delay differences) and summed. The Common Reflection Point transformation is described in terms of a VSP geometry by Wyatt, K.D. and Wyatt, S.B., THE DETERMINATION OF SUBSURFACE STRUCTURAL INFORMATION USING THE VERTICAL SEISMIC PROFILE, Technical Paper No. 55.2, 51st Annual Meeting of SEG, pp. 1915-1949. FIG. 7 shows an example of a transformation of the drill bit generated reflection data to Common Reflection Point 84. The transformation assumed a horizontally stratified earth. Reflecting layers are clearly imaged using the drill bit signal.

By including refraction of waves at interfaces, dipping reflectors, and raytracing, the transformation becomes more than a "CDP stack", it becomes a raytheoretically correct imaging technique.

It is very important in common reflection point imaging that the velocity function of the region be accurately known. This is sometimes termed the "chicken and the egg" constraint on imaging of surface seismic reflection data. To image the data correctly, the velocity function in the earth must be accurately known, but to determine the velocity function it is usually necessary to have an imaged seismic data set. Fortunately, our data circumvents this problem with the interval velocities obtained from the direct arrival.

With conventional surface seismic, the seismic interval velocities are derived indirectly through either external information .g., sonic logs, or checkshot information nearby), or through velocity analysis of the acquired data. With the drill bit signal, interval velocities can be directly determined through the correlation time delay of the direct arrival signal. This yields accurate velocities above the drill bit depth. Below this depth extrapolation of other information or velocity analysis must be used as in surface seismic data.

It should now be readily apparent to those skilled in the art that a novel apparatus and method for providing information while drilling on subterranean geologic formations capable of achieving the stated objects of the invention has been provided. The apparatus and method make improved use of a reference signal to provide the desired information. Improved signal processing of the seismic wave signals is made possible by the reference signal. All of the seismic wave signals used to obtain the desired information originate at the drill bit. The apparatus and method is non-invasive and generates the signals used to obtain the desired information while drilling. The apparatus and method provides real time subsurface images.

It should further be apparent to those skilled in the art that various changes in form and details of the invention as shown and described may be made. It is intended that such changes be included within the spirit and scope of the claims appended hereto.

What is claimed is:

1. An apparatus for providing information on a subterranean geologic formation, which comprises a drill bit source of energy in a borehole, at least one seismic wave sensor spaced from the borehole in the earth for receiving seismic waves imparted into the earth by said drill bit source of energy, a reference sensor for acoustic waves imparted into the borehole by said drill bit source of energy, a means connected to receive a reference signal from said reference sensor and a signal from said at least one seismic wave sensor simultaneously, recorded during a period of time when said drill bit source of energy is activated at a selected source depth and to generate a cross-correlation function between the reference and seismic wave sensor signals, a means connected to receive the reference signal to derive a whitening filter, and a means connected to receive the filter for removal of the combined effects of reference signal source spectral shaping and multipath from the cross-correlation function, the whitening filter being derived as an inverse to the reference signal and being applied to the cross-correlation function by time-reversing and then convolving the filter with the cross correlation function or alternatively being applied by time-reversing the filter and convolving the filter with the time-reversed reference signal prior to cross-correlation; said apparatus being configured to carry out its signal processing operations repetitively for a series of source depths, generating a series of filtered cross-correlation functions, said reference sensor being located at or proximate to a top of the borehole distant to said drill bit source of energy.

2. The apparatus for providing information on the subterranean geologic formation of claim 1 in which said reference sensor comprises an accelerometer located on a swivel of said drilling rig.

3. The apparatus for providing information on the subterranean geologic formation of claim 1 in which said drilling rig is located on an offshore platform.

4. The apparatus for providing information on the subterranean geologic formation of claim 1 in which said at least one seismic wave sensor comprises a plurality of sensors located proximate to a surface of the earth at predetermined locations relative to the borehole.

5. The apparatus for providing information on the subterranean geologic formation of claim 1 in which incoherent energy is attenuated in the cross-correlation function.

6. The apparatus for providing information on the subterranean geologic formation of claim 1 additionally comprising means for converting the travel times of arrivals represented in the cross-correlation function to travel times that would be observed if a reference sensor were located proximate to said source of energy by time shifting the cross-correlation function, the time shift being made equal to the delay of acoustic waves traveling from the source location to the reference location at the top of the borehole, the delay being calculated as the length of the acoustic path divided by the acoustic velocity along said path.

7. The apparatus for providing information on the subterranean geologic formation of claim 6 additionally comprising means connected to the cross-correlated and time-shifted signals for determining interval velocities based on differential travel time of the direct arrival from two different source depths divided into a differential path length from said source to said at least one seismic wave sensor.

8. The apparatus for providing information on the subterranean geologic formation of claim 6 additionally comprising means connected to receive the cross-correlated and time shifted signals for determining average velocities between the source depth and the sensor location at the surface based on the travel time of the direct arrival signal divided into the distance from the source location to the geophone location.

9. The apparatus for providing information on the subterranean geologic formation of claim 6 additionally comprising a means connected to receive the series of cross-correlation functions for separating the series of cross-correlation functions into a first group representing the seismic waves received by said at least one seismic wave sensor via direct seismic wave paths, and a second group representing the seismic waves received by the at least one seismic wave sensor via seismic wave paths reflected by the subterranean geologic formation.

10. The apparatus for providing information on the subterranean geologic formation of claim 9 in which said separating means is configured to attenuate direct arrival energy in the series of cross-correlation functions from different source depths by averaging the cross-correlations and subtracting the average from the series of cross-correlation functions from different source depths.

11. The apparatus for providing information on the subterranean geologic formation of claim 9 in which said separating means is configured to transform the cross-correlation functions from a series of drilling depths to a domain of frequency-wavenumber with a two-dimensional Fourier transform and then attenuate direct arrival energy through the use of a pie-slice spatial frequency attenuation filter.

12. The apparatus for providing information on the subterranean geologic formation of claim 9 additionally comprising a means connected to the first group of the separated cross-correlation functions to derive a deconvolution operator, a means connected to the second group of separated cross-correlation functions and to said deconvolution operator deriving means to deconvolve the second group of the seismic wave sensor signals.

13. The apparatus for providing information on the subterranean geologic formation of claim 9 additionally comprising means connected to the cross-correlated and time-shifted signals for providing a common reflection point image of the subterranean geologic formation.

14. The apparatus for providing information on the subterranean geologic formation of claim 13 in which said means for providing the common reflection point image is connected to receive the second group of cross-correlation functions representing the seismic waves reflected by the subterranean geologic formation for providing the common reflection point image.

15. The apparatus for providing information on the subterranean geologic formation of claim 14 in which said means for providing the common reflection point image is configured to provide the image from a transformation via a ray tracing procedure combining reflected energy from a given reflection point in the earth corresponding to different source-receiver pairs.

16. A method for providing information on a subterranean geologic formation, which comprises providing a drill bit source of energy in a borehole, receiving, with at least one seismic wave sensor spaced from the borehole in the earth, signals representative of seismic waves imparted into the earth by the drill bit source of energy, simultaneously receiving a reference signal from acoustic waves imparted into the borehole by the drill bit source of energy, the signals being received during a period of time when the drill bit source of energy is activated at a selected source depth, generating a cross-correlation function between the reference and the seismic wave sensor signals during a period of time when the source of energy is activated at the selected source depth, deriving a whitening filter from the reference signal the whitening filter being configured as an inverse to the reference signal, applying the filter to the cross-correlation function by time-reversing and then convolving the filter with the cross-correlation function or alternatively applying the filter by time-reversing the filter and convolving the filter with the time-reversed reference signal prior to cross-correlation for removal of the combined effects of reference signal source spectral shaping and multipath from the cross-correlation function, and repeating the above operations for the series of source depths, generating a series of filtered cross-correlation functions, the reference signals being received at or proximate to a top of the borehole distant to the drill bit source of energy.

17. The method for providing information on the subterranean geologic formation of claim 16 in which the signals containing seismic waves are received at a plurality of predetermined locations relative to the borehole proximate to a surface of the earth.

18. The method for providing information on the subterranean geologic formation of claim 16 in which the signals containing seismic waves are received simultaneously at a plurality of locations in the earth spaced from the borehole and in which incoherent interference is attenuated by combining the signals containing the seismic waves and by the cross-correlation process.

19. The method for providing information on the subterranean geologic formation of claim 16 in which the borehole contains the drill bit source of energy attached to a drill string in the borehole and the acoustic waves received by the reference sensor propagate within the drill string.

20. The method for providing information on the subterranean geologic formation of claim 16 in which the reference signals are received at the top of the borehole, the method additionally comprising the step of converting the travel times of arrivals represented in the cross-correlation function to travel times that would be observed if a reference sensor were located proximate to the drill bit source of energy by time shifting the cross-correlation function, the time shift being made equal to the delay of acoustic waves traveling from the drill bit source of energy to the reference location at or proximate to the top of the borehole, the delay being calculated as the length of the acoustic path divided by the acoustic velocity along the path.

21. The method for providing information on the subterranean geologic formation of claim 20 in which the time delay is applied to the reference signal prior to cross-correlation.

22. The method for providing information on the subterranean geologic formation of claim 20 additionally comprising the step of determining interval velocities from the cross-correlated and time-shifted signals based on the differential travel time of the direct arrival from two different source depths divided into a differential path length from the drill bit source of energy to the seismic wave signal receiving location.

23. The method for providing information on the subterranean geologic formation of claim 20 additionally comprising the step of determining average velocities between the source depth and the sensor location at the surface from the cross-correlated and time shifted signals based on the travel time of the direct arrival signal divided into the distance from the source location to the seismic wave signal receiving location.

24. The method for providing information on the subterranean geologic formation of claim 20 additionally comprising the step of separating the cross-correlation functions into a first group representing the seismic waves received by direct seismic wave paths, and a second group representing the seismic waves received via seismic wave paths reflected by the subterranean geologic formation.

25. The method for providing information on the subterranean geologic formation of claim 24 additionally comprising the step of attenuating direct arrival energy in the series of cross-correlation functions from different source depths by aligning in time the direct arrival energy of the series, and by averaging the cross-correlations and subtracting the average from the series of cross-correlations from different source depths.

26. The method for providing information on the subterranean geologic formation of claim 24 additionally comprising the steps of transforming the cross-correlation functions from a series of drilling depths to a domain of frequency-wavenumber with a two-dimensional Fourier transform and then attenuating direct arrival energy through use of a pie-slice spatial frequency attenuation filter.

27. The method for providing information on the subterranean geologic formation of claim 24 additionally comprising the steps of deriving a deconvolution operator to deconvolve earth reverberations from the first group of the separated cross-correlation functions and using the deconvolution operator to deconvolve the second group of the separated cross-correlation functions.

28. The method for providing information on the subterranean geologic formation of claim 24 additionally comprising the step of providing a common reflection point image of the subterranean geologic formation from the cross-correlation and time-shifted signals.

29. The method for providing information on the subterranean geologic formation of claim 28 in which the second group of cross-correlation functions representing the seismic waves reflected by the subterranean geologic formation is used to provide the common reflection point image.

30. The method for providing information on the subterranean geologic formation of claim 29 in which the common reflection point image is provided from a transformation via a ray tracing procedure combining reflected energy from a given reflection point in the earth corresponding to different source-receiver pairs.

* * * * *